March 23, 1937.    J. L. STRATTON    2,074,947
REGULATING SYSTEM
Filed Sept. 17, 1936
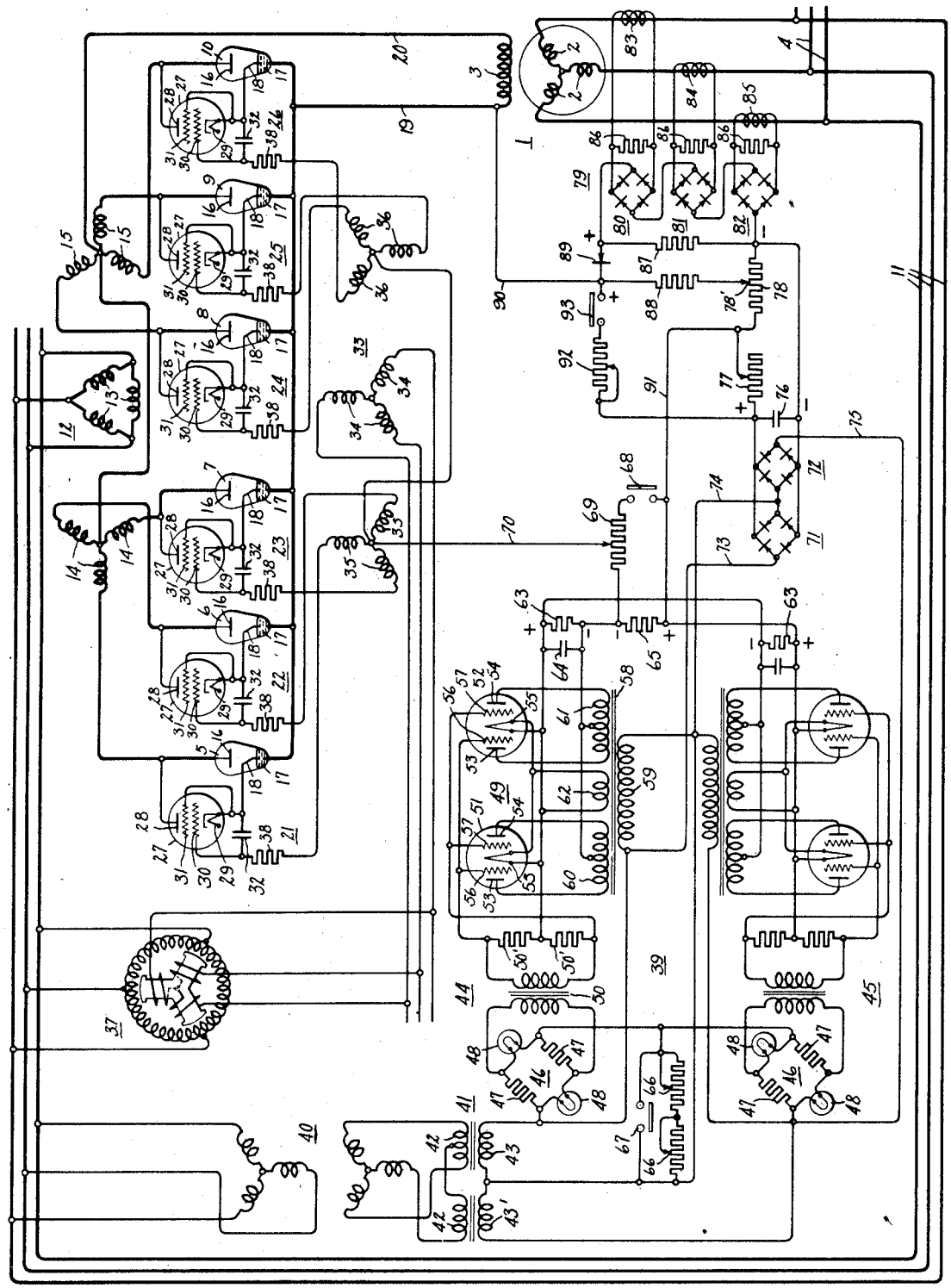
Inventor:
Jerry L. Stratton,
by Harry E. Dunham
His Attorney.

Patented Mar. 23, 1937

2,074,947

UNITED STATES PATENT OFFICE 2,074,947

REGULATING SYSTEM

Jerry L. Stratton, Schenectady, N. Y., assignor to General Electric Company, a corporation of New York Application September 17, 1936, Serial No. 101,288

22 Claims. (Cl. 171—119)

My invention relates to electric regulating systems and more particularly to systems employing electric valve means for controlling dynamoelectric machines.

In the control and regulation of electric translating apparatus and particularly in the control and regulation of dynamoelectric machines where it may be highly desirable to obtain rapid and precise control or regulation and where it is necessary to maintain an electrical condition of an associated circuit, such as the voltage of the associated circuit within narrowly defined limits, electric valve regulating systems have been found to be especially well adapted for this purpose. It has been found that there is a considerable need for electric valve regulating systems which not only perform the above-mentioned functions in a highly desirable manner but also are capable of performing these functions during long intervals of uninterrupted service. This latter requirement has necessitated and made evident the need of electric valve control and regulating systems whereby the continuity of service may be maintained even though a vital part of the electric valve regulating system becomes temporarily defective.

It is an object of my invention to provide a new and improved electric valve regulating system having the above-mentioned desirable characteristics.

It is another object of my invention to provide a new and improved electric valve regulating system for controlling an electrical condition or an operating condition of associated electric translating apparatus in accordance with a plurality of different predetermined electrical conditions of an associated circuit.

It is a further object of my invention to provide a new and improved electric valve regulating system for dynamoelectric machines whereby an electrical characteristic or an operating condition of the machine is maintained within predetermined narrowly defined limits.

In accordance with the illustrated embodiment of my invention, I provide a new and improved electric valve regulating system for controlling the operation of associated electric translating apparatus. For the purpose of explanation, I have chosen to represent my invention as applied to a regulating system for controlling the energization of a field winding of a dynamoelectric machine of the synchronous type which is connected to an associated alternating current circuit. The field winding is energized from a source of alternating current through an interposed electric valve translating apparatus which supplies direct current to the field winding. The conductivity of the electric valve means in the translating apparatus is controlled by controlling the energization of the control members associated with the electric valve means. A plurality of control or excitation circuits are associated with each of the electric valve means in the translating apparatus and the excitation circuits are in turn controlled in accordance with two or more different predetermined electrical conditions of the dynamoelectric machine, or in accordance with two or more different predetermined electrical conditions of the associated alternating current circuit. In order to effect this control of the excitation circuits, I provide an arrangement whereby there is introduced in the excitation circuits three components of unidirectional potential which are in turn impressed on control members of control electric discharge devices connected in the various excitation circuits. One of these components of potential is a positive unidirectional potential of substantially constant magnitude; another component of potential is a negative unidirectional component of potential which varies in accordance with a predetermined electrical condition, such as the current of the dynamoelectric machine or the current of the alternating current circuit; and the third component of potential is a negative unidirectional potential variable in accordance with a different predetermined electrical condition, such as the voltage of the dynamoelectric machine or the voltage of the associated alternating current circuit. There also is introduced in the excitation circuits an alternating voltage having a predetermined phase displacement relative to the voltage appearing between the anode and the cathode of the associated electric valve means in the electric translating circuit. The resultant voltage, which is the resultant of the three components of unidirectional potential and the alternating voltage, is impressed on the control members of the control electric discharge devices in the excitation circuits and varies in phase position to effect the desired control of the electric valve means in the electric translating apparatus and thereby controls the energization of the field winding of the machine.

For a better understanding of my invention, reference may be had to the following description taken in connection with the accompanying drawing, and its scope will be pointed out in the appended claims. The single figure of the accompanying drawing diagrammatically illustrates an embodiment of my invention as applied to a regulating system for controlling a dynamoelectric machine of the synchronous type.

Referring to the single figure of the accompanying drawing, I have diagrammatically represented my invention as applied to an electric valve regulating system for controlling a dynamoelectric machine 1 having armature windings 2 and a field winding 3. The armature windings 2 are connected to an alternating current circuit 4 and may be arranged to transmit energy to that alternating current circuit or to receive energy therefrom.

In order to energize the field winding 3 of the machine 1, I provide an electric translating apparatus including electric valve means 5-10, inclusive, which are interposed between a suitable source of alternating current and the field winding 3. I have chosen to show the electric valve means 5-10, inclusive, as being energized from the alternating current circuit 4 through conductors 11 and a transformer 12 having primary windings 13 and groups of secondary windings 14 and 15. It will be obvious to those skilled in the art that the electric valve means 5-10, inclusive, may be energized from an alternating current circuit which is independent of the circuit 4. The electric valve means 5-10, inclusive, are preferably of the type employing ionizable mediums, such as gases or vapors, and each of these electric valve means has been shown as including an anode 16, a mercury pool cathode 17 and an associated immersion-ignitor control member 18. The cathodes 17 of electric valves 5-10, inclusive, are connected to one terminal of the field winding 3 through a conductor 19, and the neutral connections of the secondary windings 14 and 15 of transformer 12 are connected to the other terminal of the field winding 3 through a conductor 20.

A plurality of excitation circuits 21-26, inclusive, are employed to control the energization of the immersion-ignitor control members 18 of electric valves 5-10, respectively. Each of these excitation circuits includes a control electric discharge device 27, preferably of the type employing an ionizable medium such as a gas or a vapor, each having an anode 28, a cathode 29, a control member 30 and an auxiliary control member 31. The auxiliary control member 31 is connected to the cathode 29. The associated control electric discharge device 27 in each of the excitation circuits 21-26, inclusive, is connected across the anode 16 and the immersion-ignitor control member 18 of the associated electric valve means so that the potential impressed between the anode 28 and the cathode 29 of the electric discharge device varies in accordance with the potential appearing between the anode 16 and the cathode 17 of the associated main electric valve means. A capacitance 32 is connected between the cathode 29 and the control member 30 of each of the electric discharge devices 27 to suppress high voltage transients.

To impress on the control members 30 of the electric discharge devices 27 an alternating voltage, I employ a transformer 33 having primary windings 34 and secondary windings 35 and 36. Any conventional phase shifting arrangement, such as the rotary phase shifting device 37, may be interposed between a suitable source of alternating current and the transformer 33 to control or adjust the phase of the control alternating voltage impressed on control members 30 of electric discharge devices 27 in excitation circuits 21-26, inclusive. Current limiting resistances 38 are connected in series relation with the secondary windings 35 and 36 of transformer 33 and the control members 30 of electric discharge devices 27.

The excitation circuits 21-26, inclusive, are controlled in accordance with different predetermined controlling influences, such as electrical conditions of the dynamoelectric machine 1, or of the alternating current circuit 4 to effect control of the direct current supplied to the field winding 3. To effect this result, I provide means for introducing in these excitation circuits components of unidirectional biasing potentials which vary in accordance with the predetermined electrical conditions to control the phase position of the resultant voltage impressed on the control members 30 of control electric discharge devices 27 and thereby effect control of the time of the energization of immersion-ignitor control members 18 of electric valve means 5-10, inclusive. In order to introduce in these excitation circuits a component of negative unidirectional biasing potential which varies in accordance with one electrical condition, such as the voltage of the machine 1 or the voltage of the alternating current circuit 4, I employ a circuit 39 which is energized from the armature windings 2 of machine 1 or from the alternating current circuit 4 through conductors 11, a transformer 40 and a transformer 41. The transformer 41 is provided with primary windings 42 and secondary windings 43 and 43'. The primary windings 42 of transformer 41 are T-connected to effect a three phase-two phase voltage transformation. The secondary windings 43 and 43' provide two alternating current circuits having voltages in quadrature. Two separate circuits 44 and 45 are energized from a different one of the secondary windings 43 and 43', respectively, of transformer 41, and each is arranged to provide independently of the other a negative unidirectional biasing potential which varies in accordance with the voltage of the machine 1 or the voltage of the circuit 4.

Each of the circuits 44 and 45 includes a bridge circuit 46 including resistances 47 having a linear current-resistance characteristic and elements such as suitable incandescent lamps 48 having a nonlinear current-resistance characteristic. The output of the bridge circuits 46 is employed to control an electric valve amplifying and rectifying means 49 and is connected to the latter through a suitable transformer 50. Resistances 50' are connected in series relation and are connected across the terminals of a secondary winding of the transformer 50 so that there is provided an electrical intermediate tap. The amplifying and rectifying means 49 may comprise two electric discharge devices 51 and 52 of the high vacuum type for providing a unidirectional current which varies in accordance with the variation in the output voltage of the bridge circuit 46. Each of the electric discharge devices 51 and 52 includes anodes 53 and 54, a cathode 55 and control members 56 and 57. The amplifying and rectifying means 49 is energized from one of the alternating current circuits provided by transformer 41, such as the secondary winding 43 of this transformer, through a transformer 58 having a primary winding 59, secondary windings 60 and 61 which are associated with electric discharge devices 51 and 52, respectively, and a secondary winding 62 which serves as a heating winding for cathodes 55 of electric valves 51 and 52. The left-hand terminal of the primary winding 59 of transformer 58 is connected to the right-hand terminal of secondary winding 43 of transformer 41, and the right-hand terminal of primary winding 59 of transformer 58 is connected to a corresponding terminal of the transformer associated with circuit 45 and is also connected to the common juncture of secondary windings 43 and 43' of transformer 41. The transformers 58 in circuits 44 and 45, respectively, are energized in accordance with the voltage appearing across the terminals of secondary windings 43 and 43' of transformer 41. The electric discharge devices 51 and 52 supply a unidirectional current to a resistance 63 which is connected between the cathodes 55 of these valves and electrical intermediate taps of secondary windings 60 and 61 of transformer 58. Capacitances 64 are connected across the terminals of resistances 63 and serve to suppress high voltage transients which may exist in the circuits 44 and 45. The potentials appearing across the terminals of resistances 63 will be unidirectional and will vary in accordance with the voltage of the armature windings 2 of machine 1 or the voltage of the circuit 4. A resistance 65 is connected in series relation with the resistances 63 of circuits 44 and 45 and impresses in the excitation circuits 21–26, inclusive, a negative unidirectional biasing potential the magnitude of which varies in accordance with the voltage of machine 1 or the voltage of circuit 4.

Suitable means for controlling the current through bridge circuits 46 of circuits 44 and 45, such as the adjustable resistances 66, are connected in series relation with the secondary windings 43 and 43' of transformer 41 and the bridge circuits 46. A suitable relay or switching means 67 may be connected across the terminals of resistances 66 to short circuit these resistances to increase the output voltage of the bridge circuits 46 and to increase the output voltage and current of the amplifying and rectifying means 49. This feature of the system establishes a substantially constant negative unidirectional biasing potential to be used during the starting operation of the machine 1 when it is desired to supply a direct current of constant value to the field winding 3. A serially-connected switching means 68 and an adjustable resistance 69 are connected across the terminals of resistance 65 and serve as a means for controlling the magnitude of this component of the negative biasing potential introduced in the excitation circuits 21–26, inclusive, through a conductor 70, during the starting operation. Switching means 67 and 68 may be arranged to close simultaneously during the starting operation. When the switching means 68 is closed, only a predetermined portion of the negative biasing potential supplied by circuits 44 and 45 is impressed on the excitation circuits.

I have found that a positive unidirectional biasing potential may be introduced in the excitation circuits by means of a plurality of rectifiers each connected across a different phase of a polyphase source of alternating current and having the direct current output circuits of the rectifiers connected in parallel to assure continuity of service in the event one phase and the associated rectifier fails to function properly.

A positive unidirectional biasing potential of substantially constant magnitude is introduced in the excitation circuits by means of suitable full wave rectifiers 71 and 72 which are energized in accordance with the voltage appearing across the terminals of secondary windings 43 and 43' of transformer 41 through conductors 73–75, inclusive. A capacitance 76 is connected across the terminals of these rectifiers to suppress high voltage transients. Adjustable resistances 77 and 78 are connected in series relation across the output terminals of rectifiers 71 and 72 and impress in the excitation circuits 21–26, inclusive, a positive unidirectional biasing potential of substantially constant magnitude.

Another negative unidirectional biasing potential, which varies in accordance with a different electrical condition, such as the current of the machine 1, is introduced in the excitation circuits 21–26 by means of circuit 79 which includes full wave rectifiers 80–82, inclusive, and associated current responsive devices such as current transformers 83, 84, and 85, respectively. Resistances 86 are connected across the terminals of current responsive devices 83–85, respectively, and the rectifiers 80–82, inclusive, are energized in accordance with the potential variations appearing across these resistances. The rectifiers 80–82 are connected in series relation and the output current of these rectifiers is transmitted through a resistance 87. Another resistance 88 is connected to be energized in accordance with the potential appearing across the resistance 87 and a portion of a resistance 78 which is connected in series relation in the excitation circuits. A rectifier 89 is connected in series relation with the resistance 87 and resistance 88 to prevent current from flowing to rectifier 80 from the excitation circuits. Resistance 78 is provided with an adjustable tap 78' to control the value of the resistance and hence to adjust the magnitude of the positive unidirectional biasing potential introduced in the excitation circuits. The left-hand terminal of the field winding 3 of machine 1 is connected to the common juncture of rectifier 89 and resistance 88 through a conductor 90, and the common juncture of the resistance 77 and resistance 78 is connected to the lower terminal of resistance 65 through a conductor 91.

As a means for limiting the power delivered to or supplied by the dynamoelectric machine 1, I provide a circuit including a serially-connected adjustable resistance 92 and a relay or switching means 93 connected between the common juncture of the capacitance 76 and the resistance 77, and the common juncture of the resistance 88 and the rectifier 89. The switching means 93 is, during normal operation, maintained in the open circuit position so that this circuit does not modify the operation of the electric regulating system. When the switching means 93 is in the closed circuit position, the positive unidirectional biasing potential introduced in the excitation circuits by rectifiers 71 and 72 and associated resistances 77 and 78 is substantially decreased so that the potential impressed on the control members 30 of electric discharge devices 27 in the excitation circuits is retarded in phase to decrease the current supplied to the field winding 3 of dynamoelectric machine 1, and hence effect thereby a decrease in the power received from or delivered to the alternating current circuit 4. The relay or switching means 93 may be made to operate in accordance with, or in response to, a predetermined electrical condition or thermal condition of the dynamoelectric machine 1, or in accordance with similar conditions of the electric valve means 5–10, inclusive.

The operation of the embodiment of my invention diagrammatically shown in the single figure of the drawing will be considered when the dynamoelectric machine is operating as a motor. During the starting operation of an alternating current motor of the synchronous type, it is frequently desirable to supply to the field winding of the machine a current of predetermined constant value. Let it be assumed that the armature windings 2 of the dynamoelectric machine 1 are connected to be energized from the alternating current circuit 1 through starting and switching means, not shown, and let it be assumed that a definite value of direct current is supplied to the field winding 3. During the starting operation, the switching means 67 and 68 will be closed by auxiliary apparatus, not shown, to control the circuits 44 and 45 so that these circuits provide a negative unidirectional biasing potential of substantially constant magnitude. Under these conditions the current supplied to the field winding 3 of machine 1 will be of substantially constant value. After the machine 1 has attained synchronous speed, the switching means 67 and 68 are opened to permit the regulating system to operate in its normal manner. During normal operation the electric valve regulating system will operate to maintain a predetermined voltage of the alternating current circuit 4 and will also operate to maintain a predetermined value of current furnished by or supplied to the dynamoelectric machine 1. The rotary phase shifter 37 is adjusted so that the alternating voltage impressed on control members 30 of electric discharge devices 27 through transformer 33 is retarded in phase relative to the voltages appearing between the associated anode 28 and cathode 29. It has been found that an adjustment to effect a substantially 90 electrical degree lagging phase displacement is satisfactory. Due to the fact that the voltage of the alternating current circuit 4 is maintained substantially constant, the positive unidirectional biasing potential supplied by the rectifiers 71 and 72 and resistances 77 and 78 will be of a substantially constant value. The negative unidirectional biasing potential introduced into the excitation circuits 21-26, inclusive, by means of circuit 79 will vary in accordance with the current supplied by or supplied to the dynamoelectric machine 1. The negative unidirectional biasing potential supplied to the excitation circuits 21-26, inclusive, by the circuits 44 and 45 will vary in magnitude in accordance with the voltage of the alternating current circuit 4. Considering excitation circuit 21 in particular, the circuit through which the resultant of the alternating voltage and the unidirectional biasing potential is impressed includes control member 30 of electric discharge device 27, cathode 29, immersion-ignitor control member 18 and cathode 17 of electric valve means 5, conductor 19, conductor 90, resistance 88, the left-hand portion of resistance 78, conductor 91, resistance 65, the left-hand portion of resistance 69, conductor 70, the vertical secondary phase winding of group 35 of transformer 33, resistance 38 and control member 30.

As the current of the armature windings 2 of machine 1 increases, the unidirectional current which is supplied by rectifiers 80-82, inclusive, to the resistance 87 increases to effect an increase in one component of the negative unidirectional biasing potential introduced in the excitation circuits, so that the phase of the resultant voltage impressed on the control members 30 is retarded relative to the voltage appearing between the anodes 28 and the cathodes 29 of electric discharge devices 27. This retardation in phase of the control voltage effects a retardation in the phase of the voltage impressed on the immersion-ignitor control members 18 of electric valve means 5-10 relative to the voltage appearing between the anodes 16 and cathodes 17, so that the current conducted by these electric valve means is decreased. As a result of this control operation, the current supplied to the field winding 3 is reduced in value and coincident therewith there is effected a reduction in the excitation of the machine 1 causing the armature current to increase or decrease, depending upon whether the machine 1 is under-excited or over-excited.

As concerns the operation of circuits 44 and 45, which operate in accordance with the voltage of the alternating current circuit 4 to control the excitation of the machine 1, let it be assumed that the voltage of the circuit 4 temporarily increases to a value above the predetermined value for which these circuits are adjusted. Slight variations in the value of the voltage of circuit 4 will, of course, appear across the terminals of secondary windings 43 and 43' of transformer 41, and these voltage variations will be amplified due to the nonlinear current-resistance characteristic of the bridge circuits 46. By virtue of the increase in the output voltage of bridge circuits 46, the electric discharge devices 51 and 52 of circuits 44 and 45 will provide increased negative unidirectional biasing potentials which act in series relation in the excitation circuits 21-26, inclusive, and these biasing potentials are introduced therein through resistances 63, resistance 65 and resistance 69. It will be noted that since the resistances 63 in circuits 44 and 45 are connected in series relation relative to each other, the voltage appearing across the terminals of resistance 65 will be the sum of the voltages appearing across the terminals of resistances 63. This increase in one component of the negative biasing potentials acting in the excitation circuits will decrease the current supplied to the field winding 3 of electric valve means 5-10, inclusive. On the other hand, when the voltage of the alternating current circuit 4 decreases to a value below a predetermined value, the circuits 44 and 45 will respond to decrease this component of the negative unidirectional biasing potential to cause an increase in the field current of the machine 1.

It is to be noted that the circuits 44 and 45 operate independently to introduce into the excitation circuits separate components of unidirectional biasing potentials which are combined through the resistance 65. In the event either of the circuits 44 or 45 becomes inoperative and fails to provide a predetermined component of biasing potential, the system may nevertheless be maintained in operation by virtue of the fact that the other circuit will respond to introduce into the excitation circuit a negative biasing potential which varies to maintain the predetermined voltage of the alternating current circuit 4. For example, if the circuit 44 becomes defective, the temporary reduction in this component of negative biasing potential occasioned thereby will effect a decrease in the voltage of the alternating current circuit 4 so that the output voltage of the resistance bridge 46 in circuit 45 will be substantially increased to effect a corresponding increase in the negative biasing potential supplied by the circuit 45. This electric valve regulating system not only provides an arrangement for maintaining the voltage of an associated circuit within narrowly defined limits, but also assures a greater continuity of service than that provided by the arrangements used heretofore.

In the event the machine 1 becomes overloaded so that the relay or switching means 93 is operated to close the circuit including resistance 92, this operation will effect a predetermined reduction in the value of the positive unidirectional biasing potential introduced in the excitation circuits 21–26, inclusive, by the rectifiers 71 and 72 and the serially-connected resistances 77 and 78. In this way, it is possible to control the maximum value of current supplied to the field winding 3 and hence to effect a control of the load placed upon the machine 1 in accordance with predetermined conditions of the machine 1 or associated apparatus in the electric valve translating circuit.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a dynamoelectric machine having an armature circuit and a field circuit, a source of alternating current and an electric valve translating apparatus for energizing said field circuit, and an excitation circuit for controlling said electric valve translating apparatus comprising an electric discharge device having a control member, means for impressing on said control member a negative unidirectional biasing potential variable in accordance with a predetermined electrical condition of said armature circuit and means for impressing on said control member a second negative unidirectional biasing potential variable in accordance with a different predetermined electrical condition of said armature circuit.

2. In combination, a dynamoelectric machine having an armature circuit and a field circuit, a source of alternating current and an electric valve translating apparatus for supplying direct current to said field circuit, and an excitation circuit for controlling said electric valve translating apparatus comprising an electric discharge device having a control member, means for impressing on said control member an alternating voltage displaced in phase relative to the voltage of said alternating current circuit, means for impressing on said control member a positive unidirectional biasing potential of substantially constant magnitude, means for impressing on said control member a negative unidirectional biasing potential variable in accordance with a predetermined electrical condition of said armature circuit and means for impressing on said control member a second negative unidirectional biasing potential variable in accordance with a different predetermined electrical condition of said armature circuit.

3. In combination, an alternating current circuit, a dynamoelectric machine having an armature winding connected to said alternating current circuit and having a field winding, means for energizing said field winding in accordance with predetermined electrical conditions of said alternating current circuit comprising a source of alternating current, electric valve means interposed between said source of alternating current and said field winding, and means for controlling said electric valve means comprising an electric discharge device having a control member and an excitation circuit therefor including means for impressing on said control member an alternating potential displaced in phase relative to the potential of said source, means for impressing on said control member a negative unidirectional biasing potential variable in accordance with a predetermined electrical condition of said alternating current circuit and means for impressing on said control member a second unidirectional biasing potential variable in accordance with a different predetermined electrical condition of said alternating current circuit.

4. In combination, an alternating current circuit, a dynamoelectric machine of the synchronous type having an armature winding connected to said alternating current circuit and having a field winding, a source of alternating current, electric translating apparatus interposed between said source of alternating current and said field winding for supplying direct current to said field winding including an electric valve means having a control member of the immersion-ignitor type, and an excitation circuit for energizing said immersion-ignitor control member to control the energization of said field winding in accordance with the voltage and the current of said alternating current circuit comprising an electric discharge device connected across an anode and said immersion-ignitor control member of said electric valve means and having a control member, means for impressing on said control member an alternating voltage, means for impressing on said control member a positive unidirectional biasing potential of substantially constant value, means for impressing on said control member a negative unidirectional biasing potential variable in accordance with the voltage of said alternating current circuit and means for impressing on said control member a second negative unidirectional biasing potential variable in accordance with the current of said alternating current circuit.

5. In combination, an electric circuit, an electric discharge device connected therein and having a control member, and an excitation circuit for controlling said electric discharge device comprising means for impressing on said control member a unidirectional potential of substantially constant magnitude, means for impressing on said control member a second unidirectional potential variable in accordance with a controlling influence and means for impressing on said control member a third unidirectional potential variable in accordance with a different controlling influence.

6. In combination, an electric circuit, an electric discharge device connected therein and having a control member, and an excitation circuit for controlling said electric discharge device comprising means for impressing on said control member a unidirectional biasing potential of substantially constant magnitude, means for impressing on said control member a unidirectional biasing potential of a polarity opposite to that of said first mentioned potential and of a magnitude variable in accordance with a controlling influence and means for impressing on said control member a unidirectional biasing potential of a polarity corresponding to that of said second mentioned potential and of a magnitude variable in accordance with a different controlling influence.

7. In combination, an electric circuit, an electric discharge device connected therein and having a control member, and an excitation circuit for controlling said electric discharge device comprising means for impressing on said control member a positive unidirectional biasing potential of substantially constant magnitude, means for impressing on said control member a negative unidirectional biasing potential variable in accordance with a controlling influence and means for impressing on said control member a second negative unidirectional biasing potential variable in accordance with a different controlling influence.

8. In combination, an electric circuit, an electric discharge device connected therein and having a control member, and an excitation circuit for controlling said device comprising means for impressing on said control member an alternating voltage, means for impressing on said control member a unidirectional potential of substantially constant magnitude, means for impressing on said control member a second unidirectional potential variable in accordance with a controlling influence and means for impressing on said controlling member a third unidirectional potential variable in accordance with a different controlling influence.

9. In combination, an alternating current circuit, electric translating apparatus for controlling said circuit and including an electric discharge device having a control member, and an excitation circuit for controlling the conductivity of said electric discharge device conjointly in accordance with two different predetermined electrical conditions of said alternating current circuit comprising means for impressing on said control member a negative unidirectional biasing potential variable in accordance with one of said predetermined electrical conditions of said alternating current circuit and means for impressing on said control member a second negative unidirectional biasing potential variable in accordance with the other of said predetermined electrical conditions of said alternating current circuit.

10. In combination, an alternating current circuit, electric translating apparatus for controlling said circuit and including an electric discharge device having a control member, and an excitation circuit for controlling said electric discharge device in accordance with predetermined electrical conditions of said alternating current circuit comprising means for impressing on said control member a positive unidirectional biasing potential of substantially constant value, means for impressing on said control member a negative unidirectional biasing potential variable in accordance with a predetermined electrical condition of said alternating current circuit and means for impressing on said control member a second negative unidirectional biasing potential variable in accordance with a different predetermined electrical condition of said alternating current circuit.

11. In combination, an alternating current circuit, electric translating apparatus for controlling said circuit and including an electric discharge device having a control member, and an excitation circuit for said electric discharge device for controlling the conductivity of said electric discharge device to effect control of the voltage and the current of said alternating current circuit comprising means for impressing on said control member an alternating potential, means for impressing on said control member a negative unidirectional biasing potential variable in accordance with the voltage of said alternating current circuit and means for impressing on said control member a second unidirectional biasing potential variable in accordance with the current of said alternating current circuit.

12. In combination, an electric circuit, an electric discharge device connected therein and having a control member, and an excitation circuit for controlling said electric discharge device comprising means for impressing on said control member a potential variable in accordance with a controlling influence comprising two independent circuits for conjointly supplying said potential during normal operation, each of said circuits being arranged to provide said potential independently of the other when one of said two independent circuits fails to provide a predetermined component of said potential.

13. In combination, an alternating current circuit, electric translating apparatus for controlling said circuit and including an electric discharge device having a control member, and an excitation circuit for said electric discharge device for controlling the conductivity of said device to effect control of the current and the voltage of said alternating current circuit comprising means for impressing on said control member an alternating potential, means for impressing on said control member a negative unidirectional biasing potential variable in accordance with the current of said alternating current circuit and means including two independent circuits for impressing on said control member a second unidirectional biasing potential variable in accordance with the voltage of said alternating current circuit.

14. In combination, an alternating current circuit, electric translating apparatus for controlling said alternating current circuit and including an electric valve means having a control member, and an excitation circuit for energizing said control member comprising a control electric discharge device having a control member, means for impressing on said control member of said electric discharge device an alternating voltage, means for impressing on said control member a positive unidirectional biasing potential of substantially constant magnitude, means for impressing on said control member a negative unidirectional biasing potential variable in accordance with the current of said alternating current circuit including an inductive device responsive to the current of said circuit and a rectifier energized by said inductive device and means for impressing on said control member a second negative unidirectional biasing potential including two independent circuits each having a resistance bridge for providing an electrical quantity responsive to the voltage of said alternating current circuit and each having electric discharge means controlled by the associated resistance bridge for providing said second negative unidirectional biasing potential.

15. In combination, a three phase alternating current circuit, electric translating apparatus for controlling said alternating current circuit, and means connected to said circuit for controlling a predetermined electrical condition of said circuit comprising a T-connected transformer having secondary windings arranged to energize independent alternating current circuits having voltages in quadrature, said two circuits being energized from different secondary windings and each including means for controlling said electric translating apparatus.

16. In combination, a three phase alternating current circuit, electric translating apparatus for controlling said alternating current circuit, and means connected to said circuit for controlling a predetermined electrical condition of said circuit comprising a T-connected transformer having secondary windings arranged to energize two independent alternating current circuits having voltages in quadrature, said two circuits being energized from a different one of said secondary windings and each including a resistance bridge and an associated electric discharge device for controlling said electric translating apparatus.

17. In combination, a three phase alternating current circuit, means for providing electrical quantities which vary in accordance with a predetermined electrical condition of said circuit comprising a T-connected transformer connected to said alternating current circuit and having secondary windings arranged to provide two alternating current circuits having voltages in quadrature, and two independent circuits each energized in accordance with the voltage of a different one of said two alternating current circuits and each comprising a resistance bridge and electric discharge devices for providing said electrical quantities which vary in accordance with said predetermined electrical condition of said alternating current circuit.

18. In combination, a three phase alternating current circuit, and means for providing unidirectional potentials which vary in accordance with the voltage of said alternating current circuit comprising a T-connected transformer energized from said three phase alternating current circuit for providing two alternating current circuits having voltages in quadrature, each of said two alternating current circuits including a bridge circuit for providing electrical quantities which vary in accordance with the voltage of said alternating current circuit and electric discharge devices for providing said unidirectional potentials the magnitudes of which vary in accordance with said electrical quantities.

19. In combination, an electric circuit, electric translating apparatus for controlling said circuit and including a source of alternating current and an electric discharge device having a control member, and an excitation circuit for controlling the conductivity of said electric discharge device conjointly in accordance with two different predetermined electrical conditions of said electric circuit comprising means for impressing on said control member a negative unidirectional biasing potential variable in accordance with one of said predetermined electrical conditions and means for impressing on said control member a second negative unidirectional biasing potential variable in accordance with the other of said electrical conditions including two independent circuits for providing said second negative unidirectional biasing potential, each of said two independent circuits being arranged to provide said second negative unidirectional biasing potential independently of the other when one of said two independent circuits fails to provide a predetermined component of said second unidirectional biasing potential.

20. In combination, an electric circuit, electric valve translating apparatus connected to said circuit, and a control circuit for controlling said translating apparatus comprising a source of alternating current, an electric discharge device connected thereto and having a control member, means for impressing on said control member an alternating voltage, means for impressing on said control member a negative unidirectional biasing potential variable in accordance with a predetermined electrical condition of said alternating current circuit, means for impressing on said control member a positive unidirectional biasing potential and means for decreasing the magnitude of said positive unidirectional biasing potential when a predetermined operating condition of said translating apparatus exceeds a predetermined value.

21. In combination, an electric circuit, an electric discharge device connected therein and having a control member, an excitation circuit for energizing said control member, and means for introducing in said excitation circuit a unidirectional potential comprising a polyphase alternating current circuit and a plurality of rectifiers each energized from a different phase of said polyphase circuit and having the output circuits thereof connected in parallel.

22. In combination, an electric circuit, an electric discharge device connected therein and having a control member, an excitation circuit for energizing said control member, and means for introducing in said excitation circuit, a unidirectional potential including a two-phase alternating current circuit, a resistance connected in said excitation circuit and two rectifiers each energized from a different phase of said two-phase circuit and having the output circuits thereof connected in parallel to supply unidirectional current to said resistance.

JERRY L. STRATTON.